Patented Jan. 23, 1940

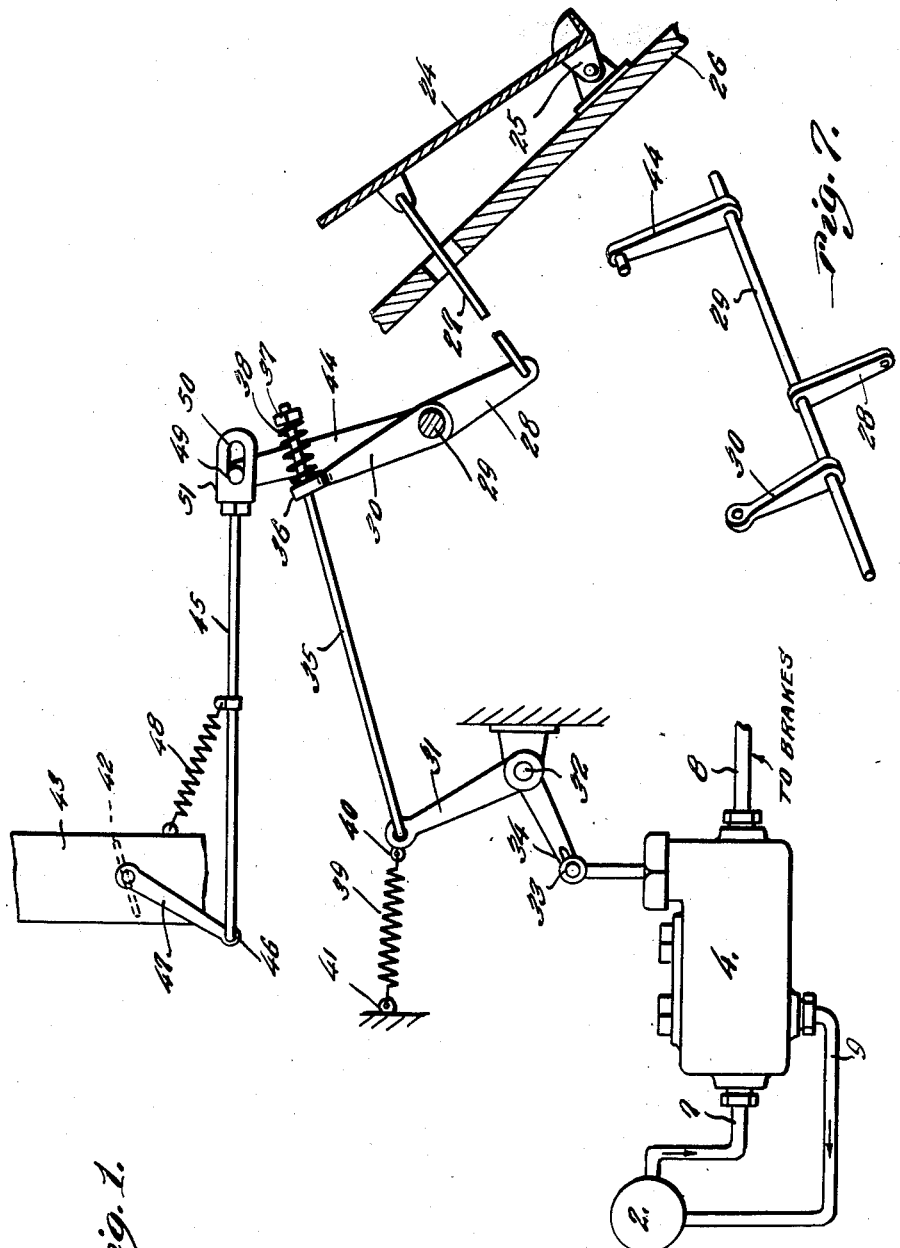

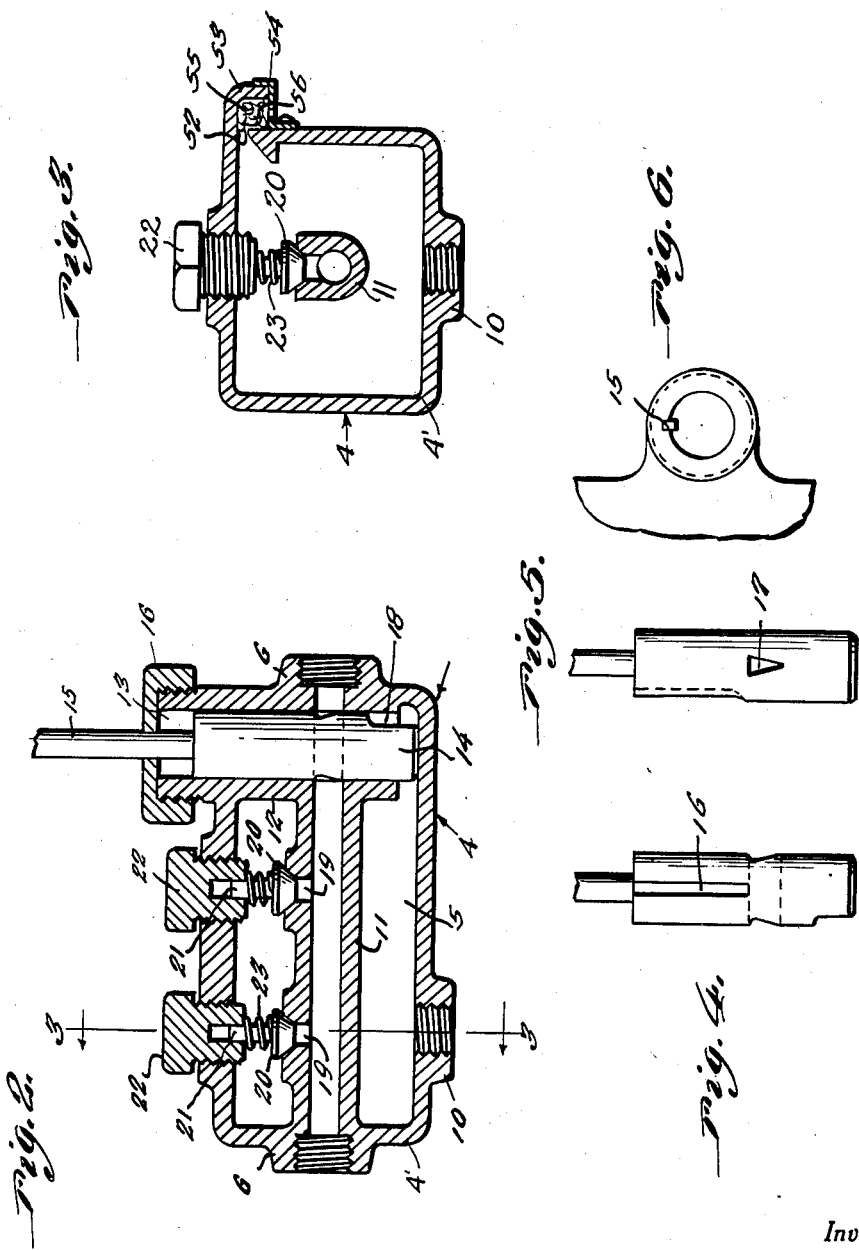

2,188,234

UNITED STATES PATENT OFFICE 2,188,234

CONTROL FOR AUTOMOBILES

Eric H. Schwenn, Lansing, Mich.

Application April 8, 1938, Serial No. 200,983

1 Claim. (Cl. 192—3)

My invention relates to controls for automobiles and more particularly to improvements in hydraulic brake operating mechanism for such vehicles.

The invention is designed with the particular purpose in view of equipping an automobile having hydraulic brakes with an efficient mechanism for hydraulically setting and equalizing the brakes under control of the foot accelerator thereby obviating the usual operations incident to applying the brakes such as transferring the foot from the accelerator to the brake pedal and applying pressure to the latter and thus providing for accomplishing a quicker stop than can be effected with the usual brake operating equipment.

Another object is to provide mechanism of the character and for the purpose above set forth for setting the brakes under control of the foot accelerator in timed relation to deceleration of the engine to idling speed thereby providing for utilizing the compression of the engine as an adjunctive force in stopping the automobile.

Still another object is to provide mechanism for the purpose above set forth and which is adapted to release the brakes as an incident to acceleration of the engine above idling speed so that the brakes will not be released until the engine has attained a speed sufficient to drive the automobile whereby back roll on hills is obviated in starting the vehicle.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a schematic view illustrating the preferred embodiment of my invention, Figure 2 is a view in vertical longitudinal section of the fluid control multiple valve, Figure 3 is a view in transverse section taken on the line 3—3 of Figure 2 looking in the direction indicated by the arrows, Figure 4 is a view in side elevation of the core of said valve, Figure 5 is a similar view of said core taken at an angle of 90° to the showing in Figure 4, Figure 6 is a fragmentary view in top plan of one end of the multiple valve casing, and Figure 7 is a view in perspective of the multiple crank shaft.

Referring to the drawings by numerals, according to my invention oil is supplied to the brake cylinders, not shown, of the automobile through the medium of a rotary type pump such as shown conventionally at 2 and which is preferably driven by any suitable means, not shown, through the crank shaft of the automobile engine. Interposed in the line of connection between the pump 2 and the brake cylinders is a multiple fluid control valve 4.

The valve 4 comprises a hollow substantially rectangular casing 4' forming a chamber 5 therein for a purpose presently seen. The ends of the casing 4' are each provided with a nipple 6. A pressure line pipe section 7 connects the pressure side of the pump 2 to one nipple 6. A second pressure line pipe section 8 connects the nipple 6 at the other end of the casing 4' with the beforementioned brake cylinders. A return line pipe section 9 extending from a nipple 10 in the bottom of the casing 4' establishes communication between the chamber 5 and the suction side of the pump 2. A tubular conduit 11 extends longitudinally through the chamber 5 and establishes communication with the nipples 6. Adjacent one end thereof the casing 4' is constructed to provide a sleeve 12 extending above the top of said casing, the bore 13 of said sleeve bisecting the conduit 11. The bore 13 has fitted therein a longitudinally slidable core 14 splined in the sleeve 12 by means of a key 15 in the latter and a key receiving groove 16 provided in said core. The sleeve 12 and core 14 form together with the conduit 11 a fluid control valve section in the valve 4. The core 14 has extending from one end thereof a stem 15 sliding in a cap 16 threaded onto the upper end of the sleeve 12. A V-shaped bore, or port, 17 extends through the core transversely thereof for registration with the interior of the conduit 11. The end of the core 14 opposite the stem 15 is cut-away to provide a by-pass channel 18 for establishing communication between the pipe line section 8 and the chamber 5 by way of the conduit 11 and sleeve 12 for a purpose to be described. The conduit 11 has formed therein a pair of pressure relief ports 19 normally closed by a pair of conical valve members 20. The members 20 have stems 21 slidably mounted in plugs 22 threaded into the casing 4'. Tension springs 23 interposed between the members 20 and plugs 22 tension said members against opening movement. By adjusting the plugs 22 the tension on the springs 23 may be varied to provide for opening movement of the members 20 under different pressures obtaining in the conduit 11 and for a purpose presently seen.

The core 14 is yieldingly held, by means presently described, in a normal position established by engagement of the cut-away end thereof with the casing 4'. In the normal position of said core 14 the channel 18 is spaced from the interior of the conduit 11 so that communication between said conduit and chamber 5 is interrupted. Also in said normal position of the core 14 the bore or port 17 registers with the interior of the conduit 11 so that the fluid is free to pass through said conduit to the before-mentioned brake cylinders and whereby the brakes of the automobile are set. As will be understood, the maximum braking pressure desired may be predetermined by setting the plugs 22 to tension the members 20 so as to maintain the desired pressure in the line of connection between the pump 2 and the brake cylinders. If for any reason the pressure in said line of connection should rise above the predetermined maximum, such pressure will move the members 20 against the tension of their springs 23 to open the ports 19 and relieve the pressure in the line by permitting escape of fluid from the conduit 11 into the chamber 5 by way of said ports 19. Fluid thus escaping into the chamber 5 will return to the pump 2 by way of pipe line section 9.

The core 14 is moved from normal position to interrupt the flow of fluid through the conduit 11 and thereby release the brakes by means of the following operating connections between the same and the foot accelerator 24 which, in this instance, is shown as having the form of the usual pedal pivoted, as at 25, to the floor board 26 of the automobile. The accelerator 24 is operatively connected, as by the link 27, to a crank arm 28 of a suitably mounted multiple crank shaft 29 so that when said accelerator is depressed from normal position, said shaft 29 is rocked in one direction. The crank shaft 29 has another crank arm 30 extending therefrom, yieldingly connected by means presently described, to one arm of a bell crank lever 31 pivotally mounted, as at 32, on a fixed part of the automobile and having its other arm connected as by a pin and slot connection 33, 34, to the stem 15 of the core 14, the arrangement being such that under the described rocking movement of the shaft 29 said bell crank 31 will be rocked in a direction to slide the core 14 from normal position. The yielding connection between the crank arm 30 and bell crank 31 comprises a rod 35 pivoted to said bell crank at one end and having its opposite end extending through an eye 36 on the crank arm 30, a nut 37 threaded onto said end of the rod 35, and a tension spring 38 interposed between said nut and crank arm 30. A tension spring 39 having its opposite ends connected to said bell crank 31 and to a fixed part of the automobile, as at 40 and 41, establishes the normal position of the core 14 and accelerator 24 in a manner which will be readily understood.

The crank shaft 29 is operatively connected to the throttle valve 42 of the carburetor 43 to open said throttle valve under rocking of the crank shaft 29 by the accelerator 24. For this purpose a third crank arm 44 is provided on the crank shaft 29 operatively connected to a pull rod 45 pivoted, as at 46, to the throttle valve lever 47 and operated by said arm 44 against the tension of a suitably connected spring 48. The operating connection between the crank arm 44 and pull rod 45 is in the form of a pin 49 on said arm extending into a slot 50 provided in a head 51 on said rod. The arrangement of the described pin and slot connection 49 and 50 is such that the arm 44 has a limited amount of play relative to the rod 45 under depression of the accelerator 24. The amount of play provided by said slot and pin connection 49 and 50 is such that the accelerator 24 may be depressed sufficiently to move the core 14 in degree sufficient to shut off the flow of fluid through the conduit 11 before the rod 45 is operated by the arm 44 to open the throttle valve 42. As will be understood, in the described normal position of the accelerator 24 and core 14 the throttle valve 42 is held closed by the spring 48 and rod 45 to maintain the engine of the automobile at idling speed.

The casing of the described valve 4 is provided in one upper side edge thereof with a slot 52 for admitting air into said casing and thereby preventing the building up of pressure in chamber 5 under the action of the members 20. Preferably the top of the casing 4 is extended beyond the slot 52 and down-turned, as at 53, to seat in a perforated right angled ledge member 54 extending from said casing, the down-turned edge 53 forming together with said member 54 a pocket 55 for containing an air filtering medium such as steel wool 56.

Referring to the operation of my invention, depression of the accelerator 24 in limited degree, determined by the play of the pin 49 in the slot 50, rocks the crank shaft 29 through the described connection 27 to the crank arm 28, clockwise as viewed in Figure 1, and in correspondingly limited degree. This limited degree of movement of the crank arm 30 correspondingly operates the bell crank lever 31, by means of the described yielding connections 35, 36, 37 and 38. Such movement of the bell crank lever 31 slides the core 14 from normal position sufficiently to move the bore 17, or port, out of the conduit 11 thereby cutting off flow of the fluid through said conduit and releasing the brakes. Coincidentally with release of the brakes, the pull rod 45 is picked up by the crank arm 44, through the pin and slot connection 49 and 50, and the throttle valve 42 opened to accelerate the engine from idling speed. As the core 14 moves to the described position, the channel 18 thereof moves into the conduit 11 to establish communication between the latter and the chamber 5 so that pressure in the brake line and cylinders is relieved. As will be clear, movement of the core 14 in the described position is limited by cap 16 and further depression of the accelerator 24 is permitted by spring 38 so that further acceleration of the speed of the engine may be effected at will. Upon release of the accelerator 24, the parts return to the normal positions, previously described under the action of the springs 39 and 48. The V-shape of the bore, or port, 17 provides for applying braking pressures in varying degree by slight movements of the accelerator 24 in the described limits of its movements as determined by the pin 49 and slot 50.

The operation of my invention will, it is believed, be readily understood from the foregoing without further explanation.

Manifestly the invention, as described, is susceptible of modification without departing from the inventive concept and right is herein reserved to such modifications as fall within the scope of the subjoined claim.

What I claim is:

In an automobile having hydraulically operative brakes, a normally closed engine throttle valve, a depressible foot accelerator, means to supply fluid under pressure to said brakes including a pump and a line of connection between said pump and brakes, a normally open fluid control valve interposed in said line of connection and operative to closing position, means operative under initial depression of said accelerator to close said control valve comprising a rock shaft, an operating connection between said accelerator and shaft whereby depression of the accelerator rocks said shaft in one direction, a valve-operating bell crank lever spring tensioned against operation to open said valve, a yielding connection between said rock shaft and lever whereby said shaft may be rocked in said one direction independently of operation of said lever in the closed position of said valve, and operating connections between said shaft and throttle valve for opening the latter under such independent rocking of said shaft.

ERIC H. SCHWENN.